No. 722,151. PATENTED MAR. 3, 1903.
J. W. SEAVER.
APPARATUS FOR MAKING BRIQUETS FOR CIRCULAR COKE OVENS.
APPLICATION FILED AUG. 26, 1902.
NO MODEL.
7 SHEETS—SHEET 1.

WITNESSES:
Geo. H. Harvey.
F. N. Barber.

INVENTOR.
John W. Seaver,
BY Wm. L. Pierce,
his ATTORNEY.

No. 722,151. PATENTED MAR. 3, 1903.
J. W. SEAVER.
APPARATUS FOR MAKING BRIQUETS FOR CIRCULAR COKE OVENS.
APPLICATION FILED AUG. 26, 1902.
NO MODEL. 7 SHEETS—SHEET 2.

WITNESSES:
Geo. H. Harvey.
F. N. Barber

INVENTOR.
John W. Seaver,
BY Wm L. Pierce
his ATTORNEY.

No. 722,151. PATENTED MAR. 3, 1903.
J. W. SEAVER.
APPARATUS FOR MAKING BRIQUETS FOR CIRCULAR COKE OVENS.
APPLICATION FILED AUG. 26, 1902.
NO MODEL.
7 SHEETS—SHEET 4.

WITNESSES:
Geo. H. Harvey.
F. N. Barber.

INVENTOR.
John W. Seaver,
BY Wm L. Pierce
his ATTORNEY.

No. 722,151. PATENTED MAR. 3, 1903.
J. W. SEAVER.
APPARATUS FOR MAKING BRIQUETS FOR CIRCULAR COKE OVENS.
APPLICATION FILED AUG. 26, 1902.
NO MODEL. 7 SHEETS—SHEET 5.

WITNESSES:
Geo. H. Harvey.
F. N. Barber

INVENTOR.
John W. Seaver,
BY Wm L. Pierce
his ATTORNEY.

No. 722,151. PATENTED MAR. 3, 1903.
J. W. SEAVER.
APPARATUS FOR MAKING BRIQUETS FOR CIRCULAR COKE OVENS.
APPLICATION FILED AUG. 26, 1902.
NO MODEL.
7 SHEETS—SHEET 6.

WITNESSES:
Geo. H. Harvey.
F. N. Barber

INVENTOR.
John W. Seaver,
BY Wm. L. Pierce
his ATTORNEY.

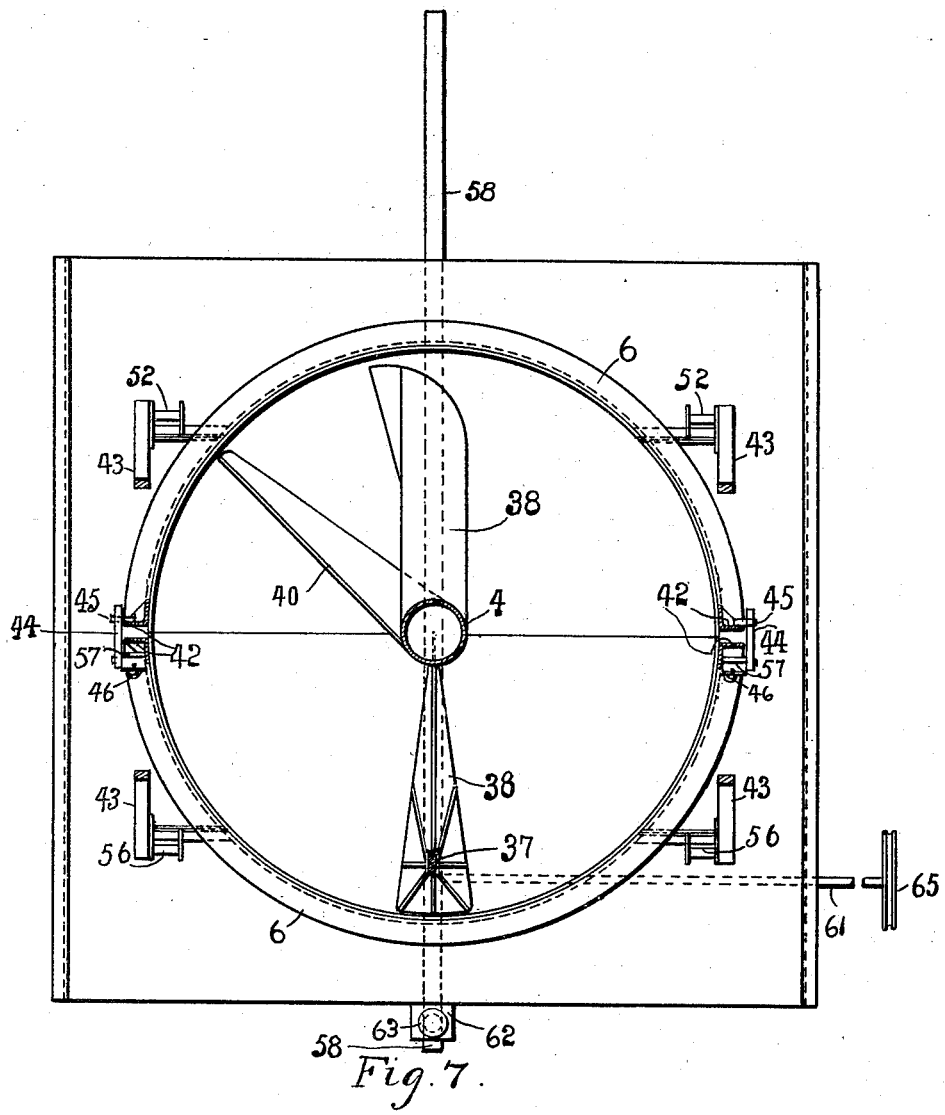

UNITED STATES PATENT OFFICE.

JOHN WRIGHT SEAVER, OF CLEVELAND, OHIO.

APPARATUS FOR MAKING BRIQUETS FOR CIRCULAR COKE-OVENS.

SPECIFICATION forming part of Letters Patent No. 722,151, dated March 3, 1903.

Application filed August 26, 1902. Serial No. 121,029. (No model.)

*To all whom it may concern:*

Be it known that I, JOHN WRIGHT SEAVER, a citizen of the United States, residing at Cleveland, in the county of Cuyahoga and State of Ohio, have invented or discovered new and useful Improvements in Apparatus for Making Briquets for Circular Coke-Ovens, of which the following is a specification.

Figure 1:
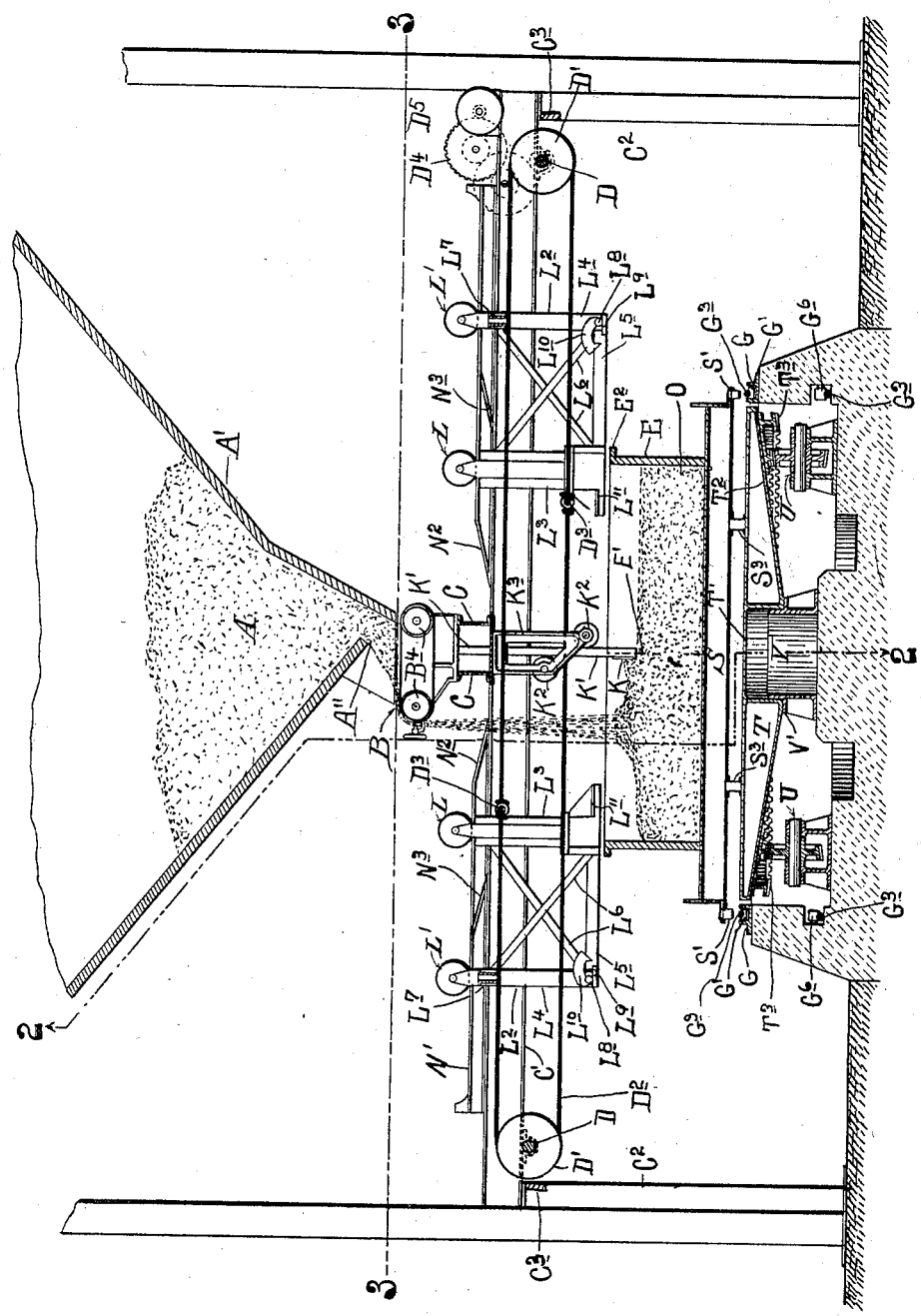
Figure 2:
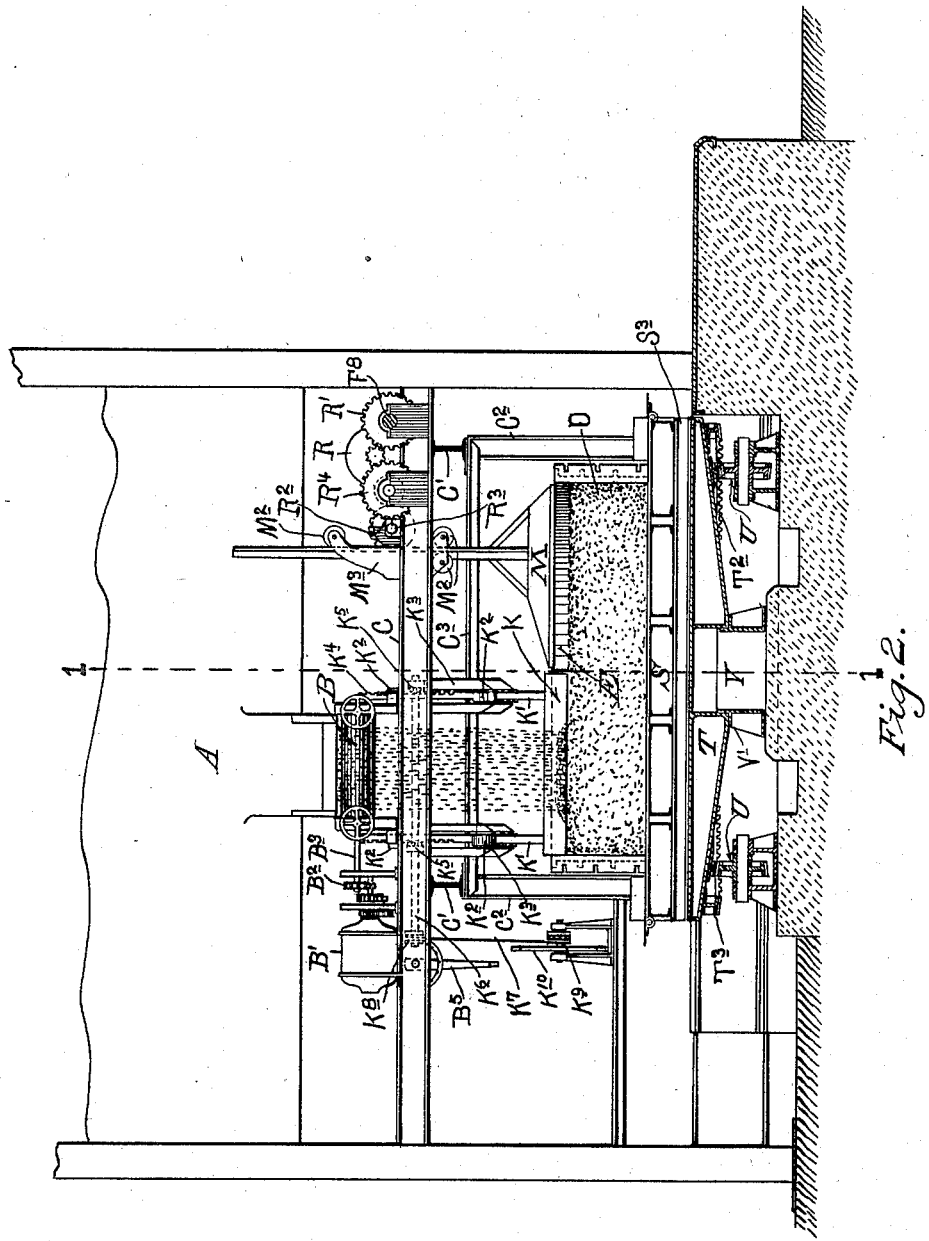
Figure 3:
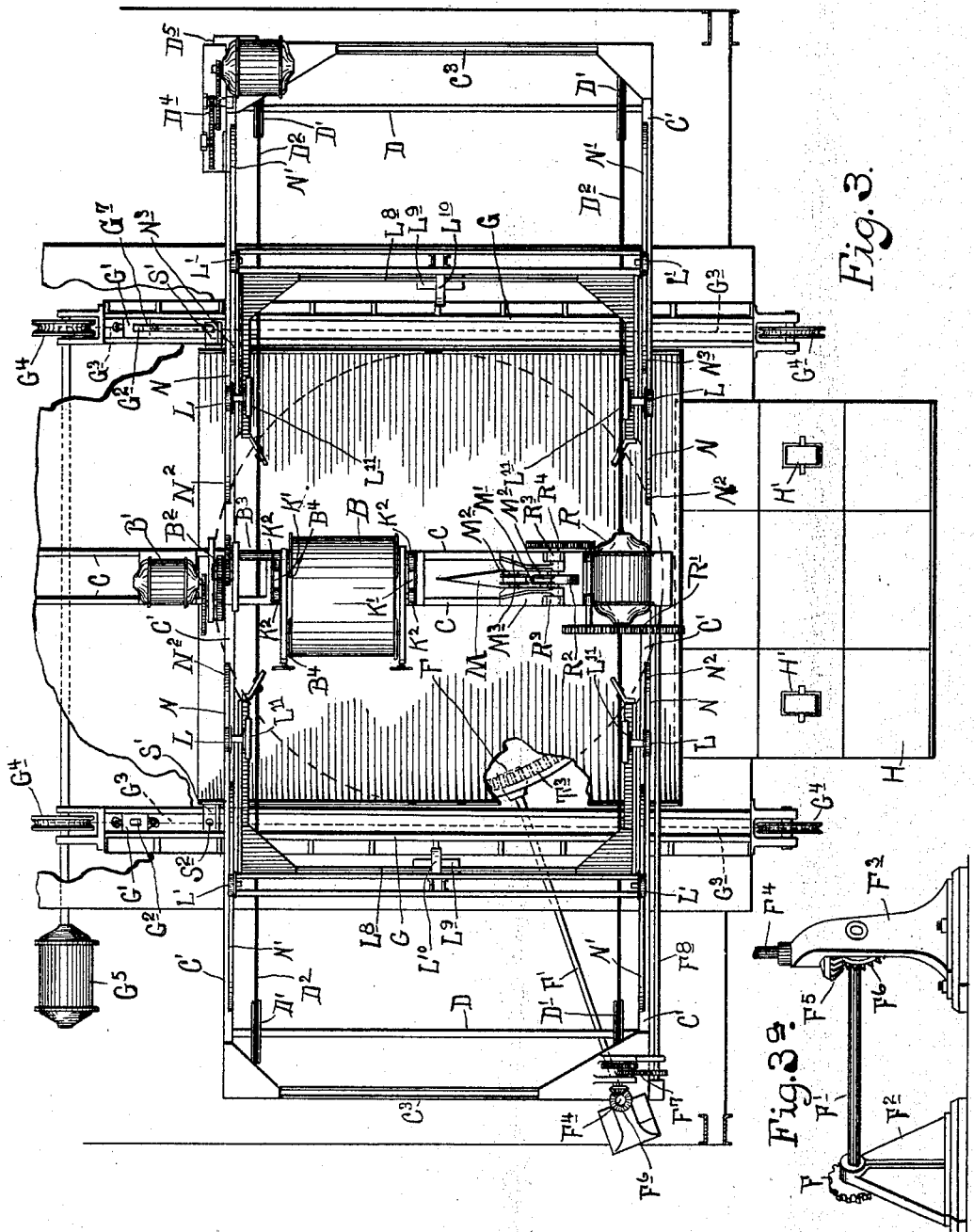
Figures 4, 8:
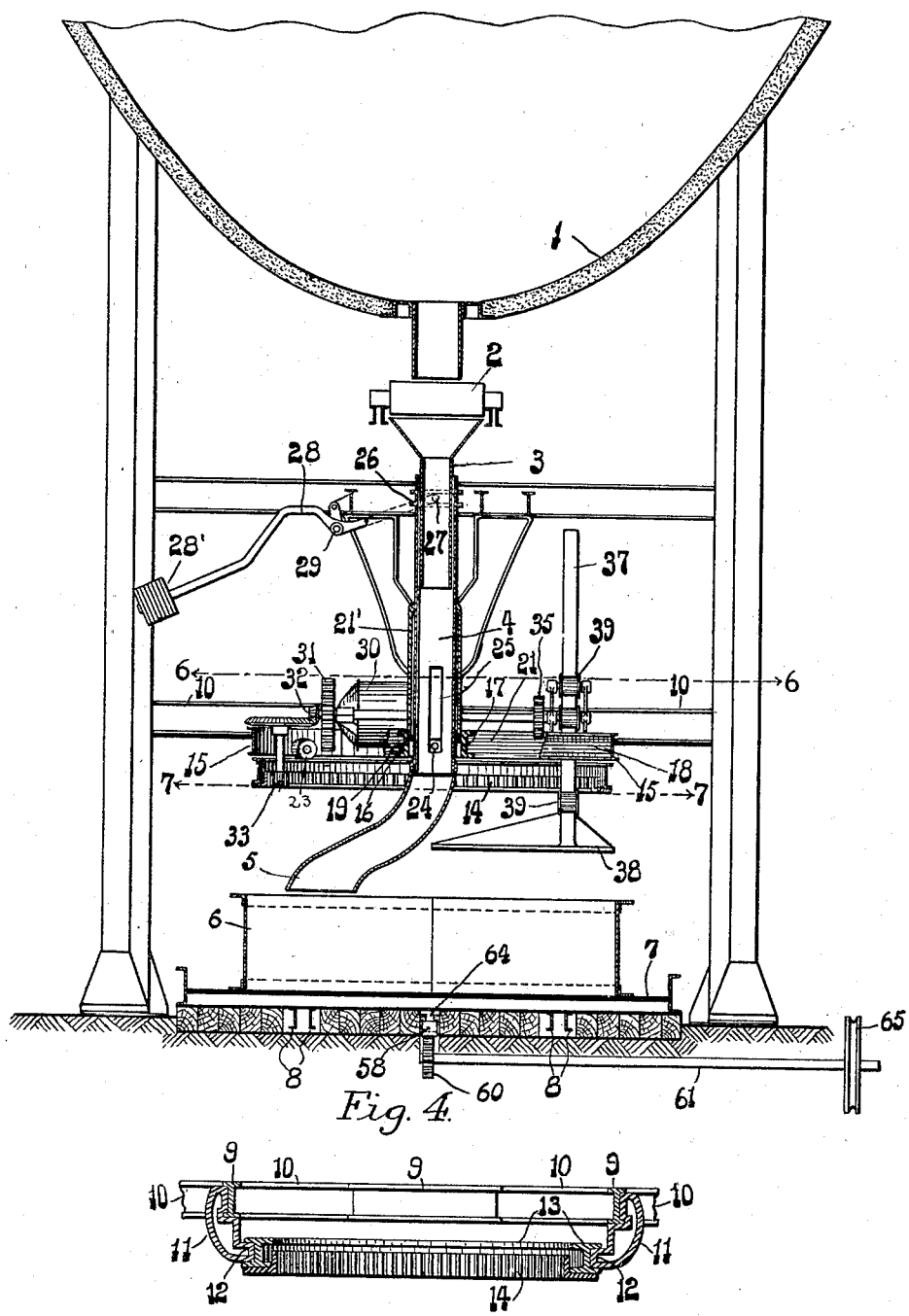
Figure 5:
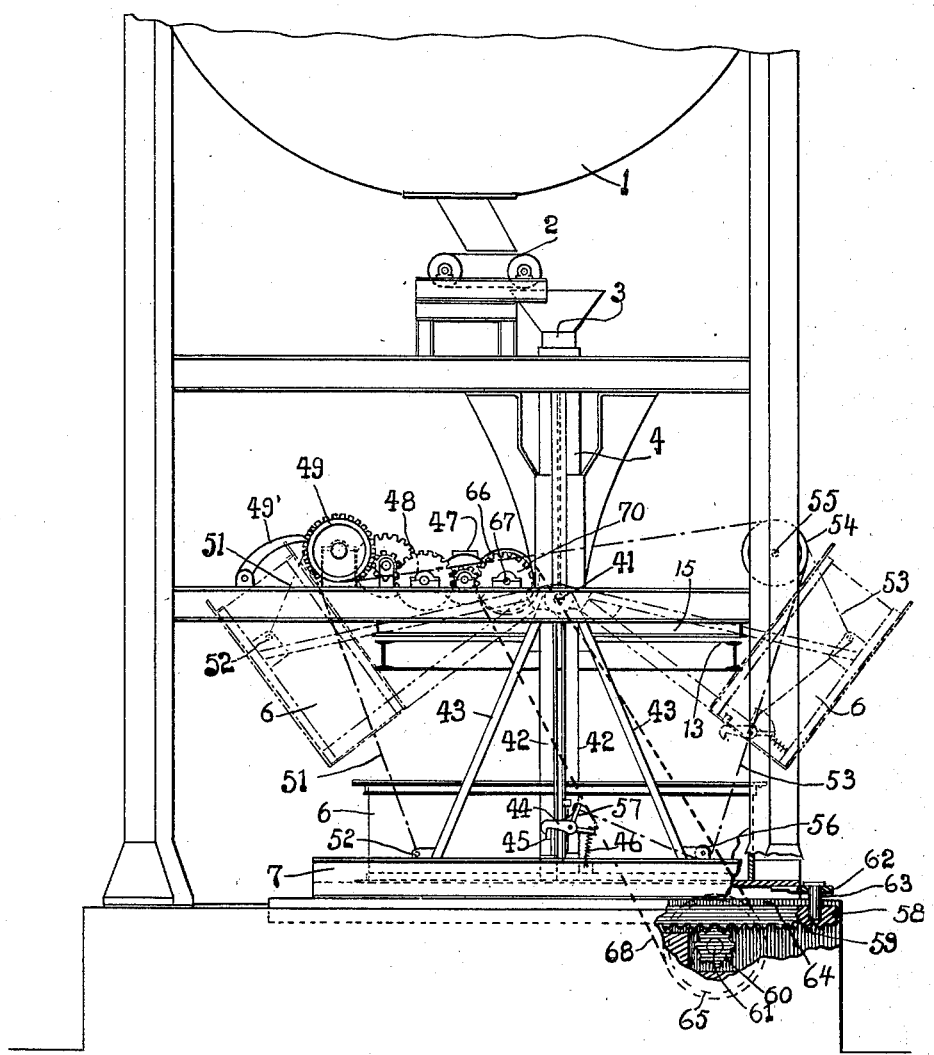
Figure 6:
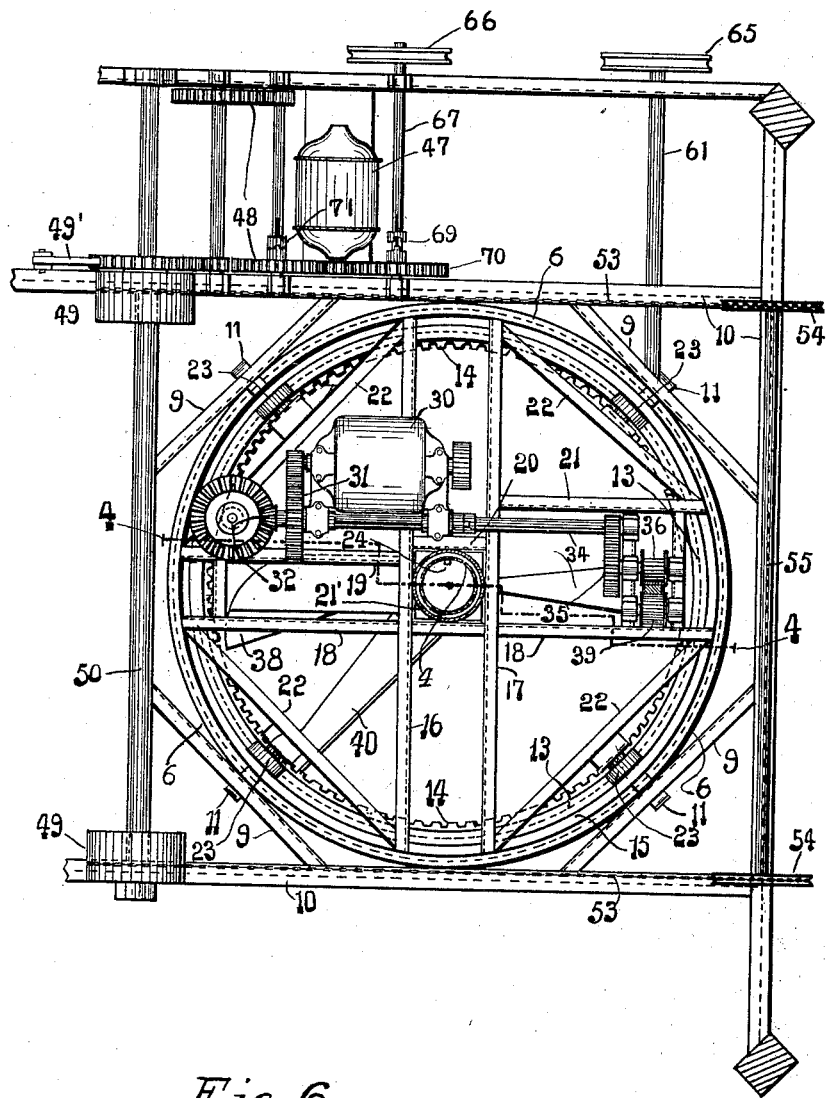

In the accompanying drawings, which make part of this specification, Figure 1 is a vertical section of my invention, taken substantially on the line 1 1 of Fig. 2; Fig. 2, a vertical section taken at right angles to Fig. 1 and substantially on the line 2 2 of Fig. 1, the mechanism for separating the mold halves or sections being omitted for the sake of clearness; Fig. 3, a horizontal section on the line 3 3 of Fig. 1, the mold being removed; Fig. 3ª, a detail in perspective of the mechanism by which the turn-table is revolved; Fig. 4, a vertical section of a modified form of my invention, taken substantially on the line 4 4 of Fig. 6, the mechanism for swinging the mold-sections being omitted; Fig. 5, an elevation, partly in section, showing particularly the means for swinging the mold-sections and moving the pan on which the mold sets, the distributing-spout, the scraper, and the hammer being left off to avoid a confusion of lines; Fig. 6, a horizontal section substantially on the line 6 6 of Fig. 4, the section on the tubes 4 and 21 being taken slightly below the other parts, and the mold and its attachments being omitted; Fig. 7, a horizontal section taken on line 7 7 of Fig. 4. Fig. 8 is a detail showing the manner in which the track 13 is supported.

My invention relates to mechanism for compressing loose coal into cakes or briquets suitable for charging into circular coke-ovens or ovens commonly known as "beehive ovens."

The method of charging beehive ovens as commonly practiced consists in feeding loose coal down through an opening in the dome or roof of the oven and in leveling it by means of rakes, hoes, or other hand appliances. By this method it is impossible to level and compact the coal evenly.

In the practice involving the use of my invention the loose coal is compressed outside of the ovens into a circular cake, having a diameter of approximately twelve feet which is the standard for beehive ovens. After the cake, moistened, if necessary, has been compacted, so that it will preserve its form, the sides of the box in which it has been formed are removed from the cake. The cake is then taken away and charged into the beehive ovens in any suitable manner, preferably after the manner set forth in Letters Patent No. 707,525; but as the charging of the ovens is foreign to the scope of this invention the same will not be described herein. As the ramming box, mold, or matrix in which the cakes are formed presents too large a surface to be compacted with a single rammer having the diameter of the box, it is necessary to ram the cakes by one or more small rammers or hammers acting successively on small surfaces of the coal. It is also found to be the better practice to ram the coal in layers, thoroughly compacting one layer before the next is added. This practice presents a great objection to the use of a hammer as large as the cake, since it would be very difficult to introduce the coal and spread it out evenly under the hammer.

As it is not advisable to compress the coal after introducing it into beehive ovens or to ram up circular cakes by means of a hammer of the diameter of the cakes, it is therefore obvious that in order to prepare a circular cake of compressed coal of large diameter the mold or matrix in which the loose coal is rammed must be rotated beneath a stationary hammer, thereby bringing each portion of the coal in the mold beneath the hammer, or the hammer must be rotated around a fixed point and over the coal in the mold, thereby bringing the hammer successively over each portion of the coal.

It is also obvious that the loose coal must be distributed evenly in the mold. To accomplish this, the mold must be rotated beneath the spout which feeds the coal into it or the spout must be revolved in the mold. The coal is discharged from the spout in either case in a ridge, which must be spread out into an even layer before being subjected to the hammer. The ridge may be spread out by rotating the mold under a stationary scraper or leveler or by rotating the scrape or leveler in the mold, as will be explained hereinafter.

There are therefore two methods of making circular cakes of coal in the practice set out in the last two paragraphs above. One way requires a mold rotating beneath a stationary or non-traveling delivery-spout, scraper, and hammer, and the other a stationary mold in which revolve a delivery-spout, a scraper, and a hammer. The result is the same in either way.

The apparatus for practicing the first method is illustrated in Figs. 1, 2, 3, and 3$^a$ and is described as follows: A represents a supply of loose coal in the bin A', which has its open mouth A'' lying over the conveyer-belt B, driven by the motor B' and the train of gearing B$^2$, connected by shaft B$^3$ with one of the drums B$^4$, over which the belt B runs. The motor B' and the drums B$^4$ are supported by beds resting on the beams C. These beams are held up by the beams C', resting on posts C$^2$, tied together by beams C$^3$. The motor B' is operated by the controller B$^5$. Beneath the conveyer-belt B is a rectangular pan S, having secured to its two rear corners ears or lugs S', provided with vertical holes S$^2$. The pan S is provided on its under side with two pairs of rails or bars S$^3$, which, as shown in Figs. 1 and 2, lie on the top of the turn-table T. Turn-table T has a central socket T', which fits over the center post V, provided with flange V', on which the wall of the socket T' rests. The outer portion of the turn-table is supported on the wheels U, which mesh with the rack-track T$^2$ on the under side of the turn-table. The track and the wheels U may have smooth coöperating surfaces, if desired. Resting on top of the pan S is the cylindrical matrix or mold E, divided at the line E' of Fig. 1 and, as shown in Fig. 2, into lateral halves. The mold has a horizontal outwardly-extending annular flange E$^2$ at its top edge. Resting upon the beams C' are four pairs of tracks N and N'. Traveling on these tracks N and N' are wheels L and L', respectively, of the mold-carriers L$^2$, of which there are two. Each mold-carrier L$^2$ consists of a rectangular frame having the vertical bars L$^3$ and L$^4$ suspended on the wheels L and L', respectively. The bars L$^3$ and L$^4$ of each frame are tied together at the bottom by the bar L$^5$ and braced by the crossed braces L$^6$. The bars L$^4$ are tied together at the top by beams L$^7$ and at the bottom by the rods L$^8$ and plates L$^9$. Pivoted centrally on the rod L$^8$ is the gravity-dog L$^{10}$, having a nose inclined, so that when it engages the top of the mold it will be lifted. The inner sides of the forward ends of the frames have each a short flange L$^{11}$, which, together with the plate L$^9$, will engage the under side of the flange E$^2$ when the frames are lowered and drawn toward each other, as will be presently explained. The tracks N and N' are provided with inclines N$^2$ and N$^3$, respectively, which lead downwardly and are separated from each other by a space equal to that between the wheels L and L', so that when the mold-conveyer frames move toward each other the wheels L and L' will be lowered simultaneously. The frames will be lowered, so that the flange L$^{11}$ and plates L$^9$ will fall below and slide under the flange E$^2$ of the mold E. Mounted in bearings on the lower side of beams C' are two shafts D, carrying wheels D', over which pass the endless cords or chains D$^2$, one limb of each cord being fastened to one mold-carrying frame and the other limb to the other frame, as shown at D$^3$. By this arrangement the two frames will approach or recede from each other, according to the direction of movement of the cord. The right-hand shaft D is driven by train of gearing D$^4$ and motor D$^5$, mounted on the end of one of the beams C'. The turntable is provided with a second annular rack T$^3$, with which the pinion F meshes. The pinion F is secured to the shaft F', having bearings F$^2$ and F$^3$, in the latter of which the lower end of the shaft F$^4$ is vertically mounted. On the lower end of shaft F$^4$ is a bevel gear-wheel F$^5$, meshing with bevel gear-wheel F$^6$ on shaft F'. Shaft F$^4$ has at its top a bevel gear-wheel F$^6$, which is rotated by train of gearing F$^7$, driven by shaft F$^8$, connected to train of gearing R' and motor R. Slidable in the channels G are blocks G', having vertical holes G$^2$. The blocks each have two eyes, to which are secured the ends of cords or chains G$^3$, passing over sheaves G$^4$, the rear two being driven by motor G$^5$. The lower limbs of the cord pass under small rollers G$^6$. The holes S$^2$ in lugs S' on pan S and the holes G$^2$ in blocks G' are adapted to receive links or ties G$^7$, one of which is shown in position in the holes in Fig. 3. H represents a table onto which the pan S may be slid from the turn-table T. The table H has antifriction-wheels H', on which the bars S, fastened on the bottom of the pan, travel when the pan is pushed out. K is a horizontal scraper or leveling-plow, which extends from near the center of the mold to its inner wall and is supported by two rods K', each of which passes up between two pairs of antifriction-wheels K$^2$, one pair being above the beams C near the edges of belt B and the other being below the said beams and mounted in the frames K$^3$, (one being shown in Fig. 1,) carried on the under side of the said beams. The outer sides of the upper ends of the rods K' have teeth K$^4$, with which mesh the teeth on the inner faces of wheels K$^5$. The shaft K$^6$ is operated by a cord K$^7$, one end being wound on the drum K$^8$ on shaft K$^6$ and the other end on drum K$^9$, operated by windlass K$^{10}$, which is located so that one operator may manage it and the controller B$^5$. M is the hammer or rammer, which is a sector of a circle and reaches from the center of the mold to its edge and is shown standing opposite the scraper. The hammer occupies but a small part of the circumference of the mold and is provided with a vertical stem M', guided by rollers M², supported by plates M³, secured to the beams C. The stem M' is raised by the cam R² on the shaft R³, driven by train of gearing R⁴ and motor R. The cam R² is a segment of a circle and is so arranged that when the cam rotates the arc-shaped part thereof engages the stem of the hammer and lifts it, and when the cam passes the stem the hammer drops. By this construction the stroke is uniform, whether the hammer is working near the top or the bottom of the mold.

The operation is as follows: The pan S and the mold E being in the position shown in Figs. 1 and 2, the scraping-bar is lowered by means of the windlass K¹⁰, drum K⁹, cord K⁷, drum K⁸, shaft K⁶, toothed wheels K⁵, and toothed rods K', so that it will lie in the path of the first layer of coal. Motors B' and R are started, the former through the gearing B² and shaft B³ causing the belt B to carry the coal evenly from the mouth of the bin and drop it down into the mold and onto the pan S in a fine stream, shown as somewhat narrower than the radius of the mold, and the latter, through gearing R', shaft F⁸, gearing F⁷, gear F⁶, shaft F⁴, gears F⁵ and F⁶, shaft F', and pinion F, causing the turn-table T, with the superposed pan S and the mold E, to be rotated as the coal is being deposited. At the same time motor R, through gearing R², shaft R³, and cam R², causes the hammer to reciprocate rapidly and compact the coal evenly into a cake, the hammer acting successively on all portions of the coal as it passes beneath it. It is necessary from time to time to raise the scraper, so that it may be at the proper level to spread out the continuously-formed ridge of loose coal dropped from the belt B.

Thus it will be seen that simultaneously the loose coal is being dropped into the mold, leveled off by the scraper, and compressed by the hammer as the mold rotates. When the cake has reached the proper thickness, motors B' and R are stopped and motor D⁵ started in such a direction that through gearing E⁴, shafts D, wheels D', and cords D² the mold-carrying frames will be rolled along tracks N and N', causing the flanges L¹¹ and the plates L⁹ to descend below and engage under the flange E² of the mold. When flange E² is thus engaged, the dogs L¹⁰, having been lifted above the top of the mold, have dropped down in front of the inner surface of the mold. Now the motor D⁵ is reversed, and as the frames support the weight of the half-mold and the dogs have locked a frame and a half-mold together the half-molds are drawn apart and raised above the pan S. When they are out of the path of the cake O, motor D⁵ is stopped. Links G⁷ are now inserted in holes G² of block G' and S² of lugs S' on pan S and motor G⁵ is started in a direction to cause block G' to push pan S off onto table H. The pan, with the cake O, may be taken to the oven by a crane, a car, or any suitable means. The pan may obviously be returned from table H to the turn-table by motor G⁵.

Referring now to Figs. 4, 5, 6, and 7, I will describe the apparatus by which the second or stationary matrix method above outlined may be practiced. 1 designates a bin or hopper from which the loose coal is fed down upon the conveyer-belt 2, operated by any suitable motor. (Not shown.) The belt feeds the coal in a steady stream down into the fixed tube 3, which delivers the coal into the revoluble tube 4, having its lower end or spout 5 offset and opening into the mold 6 at one side of the center of the latter. The mold 6 is in lateral halves or sections, as best shown in Fig. 5. The mold rests on the pan 7, provided with bars 8 on its under side, having the same functions as the bars S³ of Figs. 1 and 2. The pan and mold are located centrally under tube 4 and remain stationary during the formation of the cake. Supported on the braces 9 at some of the corners formed by the beams 10 of the framework are secured, as shown in Fig. 8, the hangers 11, having the horizontal ends 12, which are seated in the annular groove of a circular track 13. This track is stationary and provided with the internal rack 14. Above the track 13 is a rotatable bridge consisting of an annular body 15, slightly larger than track 13, the parallel beams 16 and 17, and the parallel beams 18 19 and 20 and 21, the two sets of beams being at right angles to each other. The beams 16, 17, 18, and 20 form a square opening at the center of the bridge, in which the lower end of fixed tube 21' is loosely seated. Braces 22, fastened on the bridge, carry wheels 23, which run on the top of the track 13 and support the bridge. The wheel 23 on Fig. 4 is shown without the supporting-brace, which, if shown, would conceal it. The tube 4 is connected to the beam 20 by a pin 24, fixed in the latter, which pin fits in the vertical slot in the tube, so that when the bridge rotates the tube 4 must also revolve. The slot 25 permits the tube 4 to be raised or lowered in the mold. The top of tube 4 is provided with annular ribs, forming a groove 26, in which a pin 27 in the end of lever 28, pivoted at 29, loosely fits. The lever 28 has a counterweight 28' to balance the weight of the tube 4. The tube 4 revolves in bearings formed at the ends of tube 21', which is supported by beams and hangers, as shown in Fig. 4. The bridge is rotated by the motor 30, which, through spur-wheels 31, bevel-wheels 32, and pinion 33, meshes with fixed rack 14. This motor also through shaft 34 and gearing 35 operates the cam-wheel 36, which acts on the stem 37 of the hammer 38 in the same manner as the cam R² acts on the stem M' of the hammer M. (Shown in Figs. 2 and 3.) The stem 37 is guided by the rollers 39. Secured to revoluble tube 4 and at an angle thereto is the scraper 40, which extends out radially from the central part of the mold to the side thereof. The scraper and the tube being connected together, both are rotated or swept around simultaneously, and both are raised and lowered together, so that the scraper will always act on the last layer of loose coal deposited by tube 4. As shown in dotted lines on Figs. 5 and 7, the annular mold 6 is in halves or sections, each section being supported on pin 41 by means of bars 42 and braces 43, whose lower ends are secured to the mold-sections. The mold-sections are locked together by the dogs 44, each being pivoted on a section and locking over a pin 45 on the other section. The locking end of each dog is held down by the expansion-spring 46. A motor 47 drives a train of gearing 48, which drives the drums 49, mounted on shaft 50. Cords or chains 51 are attached to these drums and are fastened to the ears 52 on one of the mold-sections. Other cords or chains 53 are attached to the drums and after passing over the sheaves 54 on shaft 55 in the framework and under sheaves 56 on the other mold-section are secured to the upstanding arms 57 on the dogs 44. The cords 51 will be normally slack enough to permit cords 53 to unlock the dog 44 from pin 45 before lifting on the ears 52. Beneath the pan 7 is a bar 58, having on its under side the rack 59, with which the pinion 60 on the shaft 61 engages. One end of the pan is provided with an ear 62, through which the removable pin 63 passes. This pin enters a hole in the bar 58, as shown in Fig. 5, and travels in the slot 64 between the upper guide-rails for the bar 58. The outer end of shaft 61 has a pulley 65, over which and a pulley 66 on shaft 67 runs a belt 68. Shaft 67 is provided with clutch 69 (operated in any approved manner) and is connected by gearing 70 to motor 47.

The operation is as follows: The tube 4 and scraper 40 are lowered by the operator moving the lever 28 upwardly till they are near the pan 7. The belt 2 and motor 30 are started, whereupon the loose coal is fed down in a steady stream through tube 4 into the pan 7. At the same time the bridge driven by the motor 30, gearing 31 and 32, and pinion 33 rotates, revolving or sweeping the spout 5 of tube 4 around in the mold, distributing the coal in a small even ridge. The scraper follows the spout 5 and levels off the ridge of coal into an even layer, and the hammer 38 follows the scraper and compacts the coal into a cake strong enough to stand alone when the mold-sections are removed. From time to time the lever 28 is pulled downwardly, so as to keep the spout 5 and the scraper 40 at a proper distance above the compressed cake. When the cake is sufficiently thick, the belt 2 and the motor 30 are stopped. After shaft 67 has been unclutched from gearing 70 motor 47 is started. The dogs 44 are first unlocked, as above explained, by the cords 53, and then the cords 51 and 53 swing the mold-sections outwardly and upwardly, as shown in dotted lines on Fig. 5. When the sections are above the top of the cake, clutch 71 is moved so as to disconnect the drums 49 from the motor 47, one of the drums 49 being locked from turning backward by catch 49', and clutch 69 is moved so as to connect shaft 67 to said motor, pin 63 having first been inserted so as to connect ear 62 on pan 7 to bar 58, whereupon the motor causes the pan, with the cake of coal resting thereon, to be slid out onto a table or car, from which it may be carried away.

I do not limit myself to the precise details of construction shown and described, but include within my invention such changes in form, arrangement, and other features of construction as come within the scope thereof.

My invention may be used to form cakes from other material than coke and cakes for other purposes than coking.

Having described my invention, I claim—

1. In a plant for forming material into cakes for coking in circular coke-ovens, feeding and compressing devices for said material, and a mold, said feeding and compressing devices having rotary horizontal travel so as to feed the material into the mold and to compress it therein.

2. In a plant for forming material into cakes for coking in circular coke-ovens, the combination of a mold, mechanism for feeding said material into the mold, and mechanism for leveling and ramming said material therein, said mechanisms collectively having horizontal travel so as to feed the material into the mold and to spread and compress it therein.

3. In a plant for forming material into cakes for coking in circular coke-ovens, a mold, mechanism for feeding said material into the mold, and mechanism for leveling and ramming said material therein, said mechanisms collectively and said mold being relatively rotatable and the leveling mechanism being adjustable independently of the ramming mechanism to compensate for the increasing thickness of the cake.

4. In a plant for forming material into cakes for coking in circular ovens, a circular mold, a feeding device for feeding said material into said mold in an even stream, a horizontal leveling device for spreading out said material, a ramming device for the leveled material, automatically adjustable so as to impart a uniform pressure at all levels of the cake, said feeding, leveling, and ramming device collectively and said mold being relatively rotatable around a vertical axis.

5. In a plant for forming material into cakes for coking in circular coke-ovens, a mold, composed of separable sections, and a bottom, means for feeding said material into said mold and compressing the same therein, means for separating said sections and removing them from said bottom, and means for removing said bottom from and returning it to its position where it constitutes a mold-bottom.

6. In a plant for forming material into cakes for coking in circular coke-ovens, a mold, and revoluble devices for distributing the material in the mold and separate means for compressing the same.

7. In a plant for forming material into cakes for coking in circular coke-ovens, a mold, and revoluble devices for feeding said material into the mold and for leveling and compressing the same therein.

8. In a plant for forming material into cakes for coking in circular coke-ovens, a circular mold, a circular track, a bridge having travel on the track and over the mold, devices fixed to said bridge, and adapted to distribute and compress the material in the mold.

9. In a plant for forming material into cakes, a mold, a revoluble delivery device adapted to travel so as to distribute the material in layers in the mold, and a compressing device for the same having rotary and reciprocating movements.

10. In a plant for forming loose material into cakes, a mold consisting of pivotally-supported sections, and a bottom, means for feeding the loose material into the mold and making a cake therein, and means for swinging the said sections from the said bottom and cake.

11. In a plant for forming loose material into cakes, a mold consisting of pivotally-supported sections, and a bottom, means for feeding the loose material into the mold and making a cake therein, means for swinging the said sections from the said bottom and the cake, and means for removing the mold-bottoms with the cake thereon after the sections have been swung clear of the same.

12. In a plant for forming loose material into cakes, a mold consisting of pivotally-supported sections, and a bottom, means for feeding the loose material into the mold and making a cake therein, and a motor and connections to the sections and bottom whereby the motor may be operated to swing the mold-sections clear of the cake and mold-bottom, and remove the bottom with the cake thereon after the said sections have been so swung.

13. In a plant for forming loose material into cakes, a mold consisting of pivotally-supported sections, and a bottom, means for feeding the loose material into the mold and making a cake therein, and means for swinging one of the said sections from the said bottom and cake.

14. In an apparatus for forming material into cakes, a circular mold, a fixed track located above the mold and provided with an annular rack, a bridge rotatable on said rack, devices fixed to the bridge for distributing and compressing said material into cakes, a motor carried by the bridge, and gearing connecting said motor and rack, whereby the motor may cause the rotation of the bridge.

15. In an apparatus for forming material into cakes, a circular mold, a fixed track located above the mold and provided with an annular rack, a bridge rotatable on said rack, devices fixed to the bridge for distributing and compressing said material into cakes, a motor carried by the bridge, and gearing connecting said motor to said rack and compressing device, whereby the motor may cause the rotation of the bridge and the actuation of the compressing device.

Signed at Cleveland, Ohio, this 20th day of August, 1902.

JOHN WRIGHT SEAVER.

Witnesses:
A. D. HATFIELD,
N. R. FAIRLAMB.